United States Patent
Wilfred et al.

(10) Patent No.: US 11,328,140 B2
(45) Date of Patent: May 10, 2022

(54) METHOD FOR ACCURATE OBJECT TRACKING WITH COLOR CAMERA IN MULTI PLANAR SCANNERS

(71) Applicant: ZEBRA TECHNOLOGIES CORPORATION, Lincolnshire, IL (US)

(72) Inventors: Sajan Wilfred, Kollam (IN); Christopher J. Fjellstad, Smithtown, NY (US); Vincent J. Daempfle, Plainview, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/856,959

(22) Filed: Apr. 23, 2020

(65) Prior Publication Data
US 2021/0334487 A1 Oct. 28, 2021

(51) Int. Cl.
*G06K 7/10* (2006.01)
*G06K 7/14* (2006.01)
*G06K 9/18* (2006.01)
*G06K 9/20* (2006.01)
*G06V 10/22* (2022.01)
*G06V 30/224* (2022.01)

(52) U.S. Cl.
CPC ....... *G06K 7/10574* (2013.01); *G06K 7/1413* (2013.01); *G06V 10/22* (2022.01); *G06V 30/224* (2022.01)

(58) Field of Classification Search
CPC .... G06K 7/10574; G06K 9/18; G06K 9/2054; G06K 7/1413
See application file for complete search history.

(56) References Cited

U.S. PATENT DOCUMENTS

| | | |
|---|---|---|
| 6,263,088 B1 | 7/2001 | Crabtree et al. |
| 2014/0132728 A1 | 5/2014 | Verano et al. |
| 2018/0157882 A1* | 6/2018 | Negro ................. G06K 7/1465 |
| 2018/0240180 A1 | 8/2018 | Glaser et al. |
| 2019/0108396 A1 | 4/2019 | Dal Mutto et al. |
| 2019/0258870 A1 | 8/2019 | Kundu et al. |
| 2020/0090348 A1 | 3/2020 | Aker |

OTHER PUBLICATIONS

International Search Report and Written Opinion for International Application No. PCT/US2021/027877 dated Jul. 21, 2021.

* cited by examiner

*Primary Examiner* — Matthew Mikels
(74) *Attorney, Agent, or Firm* — Yuri Astvatsaturov

(57) ABSTRACT

Methods for accurate object tracking are disclosed herein. An example the method includes receiving, from a first optical imaging assembly having a first field of view (FOV), a first image captured over the first FOV and based on a decode of an indicia associated with an object of interest, identifying the object of interest within the first image. The method further includes determining a location of the object of interest within the first image and mapping the location of the object of interest within the first image to a predicted location of the object of interest within a second image, the second image being received from a second optical imaging assembly having a second FOV and the second image being captured over the second FOV.

20 Claims, 7 Drawing Sheets

METHOD FOR ACCURATE OBJECT TRACKING WITH COLOR CAMERA IN MULTI PLANAR SCANNERS

BACKGROUND

At checkout systems, a barcode reader may not always identify items correctly. For example, an item may be passed across a barcode reader but the item barcode may not be read. Additionally, an item may be tagged with an incorrect barcode. Accordingly, there is a need for systems to increase item identification accuracy.

SUMMARY

In an embodiment, the present invention is a method for accurate object tracking. The method begins by receiving, from a first optical imaging assembly having a first field of view (FOV), a first image captured over the first FOV and, based on a decode of an indicia associated with an object of interest, identifying the object of interest within the first image. The method continues by determining a location of the object of interest within the first image and mapping the location of the object of interest within the first image to a predicted location of the object of interest within a second image, the second image being received from a second optical imaging assembly having a second FOV and the second image being captured over the second FOV.

In a variation of this embodiment, the method includes mapping the location of the object of interest within the first image to the predicted location of the object of interest within the second image based on a timestamp of the first image and a timestamp of the second image. In another variation of this embodiment, the first image is one of a plurality of images captured by the first optical imaging assembly and the second image is one of a plurality of images captured by the second optical imaging assembly. In another variation of this embodiment, the method includes identifying a first coordinate value along a first axis of the first image corresponding to the object of interest and identifying a second coordinate value along a second axis of the first image corresponding to the object of interest, mapping the first coordinate value to a first offset coordinate value along a first axis of the second image, wherein the first offset coordinate value is based on a relative positional relationship between the first optical imaging assembly and the second optical imaging assembly, and mapping the second coordinate value to a second offset coordinate value along a second axis of the second image, wherein the second offset coordinate value is based on the relative positional relationship between the first optical imaging assembly and the second optical imaging assembly.

In another variation of this embodiment, the method includes identifying one or more moving objects and one or more stationary areas within the second image and filtering image data associated with the second image based on at least the one or more stationary areas. In another variation of this embodiment, the method includes identifying one or more moving objects of interest within the second image based on the predicted location of the object of interest within the second image, identifying one or more foreign moving objects within the second image, the one or more foreign moving objects being separate from the one or more moving objects of interest, and filtering image data associated with the second image based on the one or more foreign moving objects. In another variation of this embodiment, the method includes identifying a bounding box around the object of interest within the second image and filtering image data in the second image based on at least one of internal contents of the bounding box and external contents of the bounding box.

In another embodiment, the present invention is a barcode reader assembly for accurate object tracking. The barcode reader assembly includes a housing, a first optical imaging assembly, a second optical imaging assembly, and a controller. The first optical imaging assembly is positioned at least partially within the housing, has a first field of view (FOV), and is configured to capture a first plurality of images. The second optical imaging assembly has a second FOV and is configured to capture a second plurality of images. The controller is communicatively coupled to the first optical imaging assembly and the second optical imaging assembly. The controller is configured to detect a decode of an indicia associated with an object of interest, the decode being based on image data from at least one first image of the first plurality of images, and, based on the decode of the indicia, determine a location of the object of interest within the at least one first image of the first plurality of images. The controller is further configured to identify a timestamp of the at least one first image of the first plurality of images, identify a corresponding at least one second image of the second plurality of images based on the timestamp of the at least one first image of the first plurality of images, and filter image data associated with the at least one second image based on the location of the object of interest within the at least one first image of the first plurality of images.

In a variation of this embodiment, the controller is mounted within the housing. In another variation of this embodiment, the second optical imaging assembly is positioned at least partially within the housing. In another variation of this embodiment, the barcode reader assembly is a bioptic barcode reader assembly.

In another variation of this embodiment, the controller is configured to identify a first coordinate value along a first axis of the at least one first image of the first plurality of images corresponding to the object of interest and identify a second coordinate value along a second axis of the at least first image of the first plurality of images corresponding to the object of interest, map the first coordinate value to a first offset coordinate value along a first axis of the at least one second image of the second plurality of images, wherein the first offset coordinate value is based on a relative positional relationship between the first optical imaging assembly and the second optical imaging assembly, and map the second coordinate value to a second offset coordinate value along a second axis of the at least one second image of the second plurality of images, wherein the second offset coordinate value is based on the relative positional relationship between the first optical imaging assembly and the second optical imaging assembly. In another variation of this embodiment, the controller is configured to identify one or more moving objects of interest within the at least one second image of the second plurality of images based on the location of the object of interest within the at least one first image of the first plurality of images, identify one or more foreign moving objects within the at least one second image of the second plurality of images, the one or more foreign moving objects being separate from the one or more moving objects of interest, and filter image data associated with the at least one second image of the second plurality of images based on the one or more foreign moving objects.

In yet another embodiment, the present invention is a system for accurate object tracking. The system includes a first optical imaging assembly, a second optical imaging assembly, and a controller. The first optical imaging assembly has a first field of view (FOV) and is configured to capture a first image over the first FOV. The second optical imaging assembly has a second FOV and is configured to capture a second image over the second FOV. The controller is configured to receive the first image and the second image and, based on a decode of an indicia associated with an object of interest, identify the object of interest within the first image. The controller is further configured to determine a location of the object of interest within the first image and map the location of the object of interest within the first image to a predicted location of the object of interest within a second image.

In a variation of this embodiment, the controller is configured to map the location of the object of interest within the first image to the predicted location of the object of interest within the second image based on a timestamp of the first image and a timestamp of the second image. In another variation of this embodiment, the controller is configured to identify a first coordinate value along a first axis of the first image corresponding to the object of interest and identify a second coordinate value along a second axis of the first image corresponding to the object of interest, map the first coordinate value to a first offset coordinate value along a first axis of the second image, wherein the first offset coordinate value is based on a relative positional relationship between the first optical imaging assembly and the second optical imaging assembly, and map the second coordinate value to a second offset coordinate value along a second axis of the second image, wherein the second offset coordinate value is based on the relative positional relationship between the first optical imaging assembly and the second optical imaging assembly.

In another variation of this embodiment, the controller is configured to identify one or more moving objects and one or more stationary areas within the second image and filter image data associated with the second image based on at least the one or more stationary areas. In another variation of this embodiment, the controller is configured to identify one or more moving objects of interest within the second image based on the predicted location of the object of interest within the second image, identify one or more foreign moving objects within the second image, the one or more foreign moving objects being separate from the one or more moving objects of interest, and filter image data associated with the second image based on the one or more foreign moving objects. In another variation of this embodiment, the controller is configured to identify a bounding box around the object of interest within the second image, and filter image data in the second image based on at least one of internal contents of the bounding box and external contents of the bounding box. In another variation of the embodiment, the first optical imaging assembly is configured to capture monochrome images and the second optical imaging assembly is further configured to capture color images.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
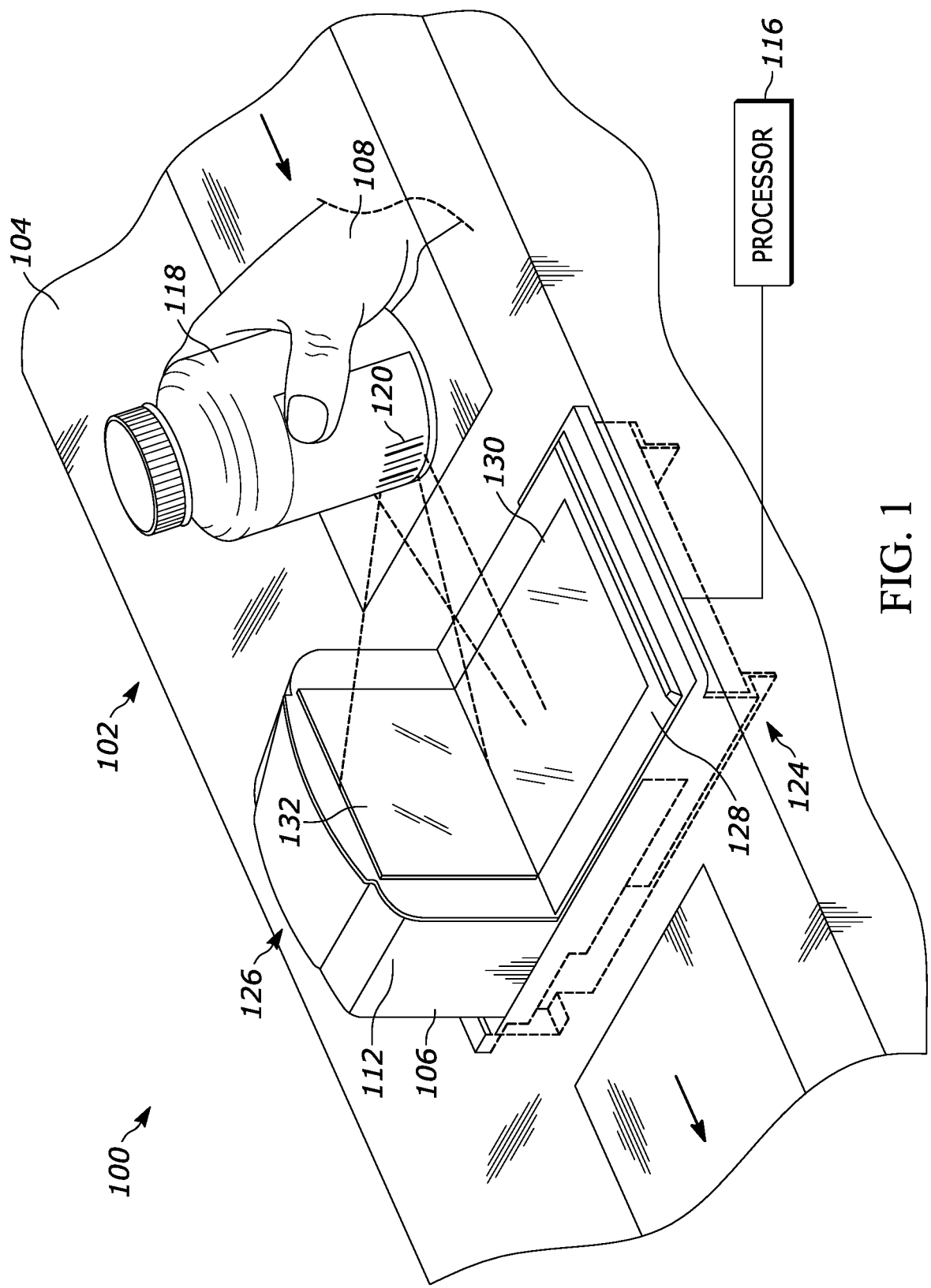
FIG. 1 illustrates a perspective view of an example checkout workstation in accordance with the teachings of this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a perspective view of an example point-of-sale (POS) system 100 in accordance with the teachings of this disclosure. In the example shown, the system 100 includes a workstation 102 with a counter 104 and a bi-optical (also referred to as "bi-optic") barcode reader 106. The barcode reader 106 may also be referred to as a bi-optic scanner or an indicia reader. The POS system 100 may be managed by a store employee such as a clerk 108. In other cases, the POS system 100 may be part of a self-checkout lane wherein customers are responsible for checking out their own products.

The barcode reader 106 includes a housing 112 comprised of a lower housing 124 and a raised housing 126. The lower housing 124 may be referred to as a first housing portion and the raised housing 126 may be referred to as a tower or a second housing portion. The lower housing 124 includes a top portion 128 and houses an optical imaging assembly 130. In some embodiments, the top portion 128 may include a removable or a non-removable platter (e.g., a weighing platter). The top portion 128 can be viewed as being positioned substantially parallel with the counter 104 surface. The phrase "substantially parallel" means+/−10° of parallel and/or accounts for manufacturing tolerances. While, in FIG. 1, the counter 104 and the top portion 128 are illustrated as being about co-planar, in other embodiments, the counter 104 may be raised or lowered relative to the top surface of the top portion 128, where the top portion 128 is still viewed as being positioned substantially parallel with the counter 104 surface.

The raised housing 126 is configured to extend above the top portion 128 and includes an optical imaging assembly 132. The raised housing 126 is positioned in a generally upright plane relative to the top portion 128. Note that references to "upright" include, but are not limited to, vertical. Thus, as an example, something that is upright may deviate from a vertical axis/plane by as much as 45 degrees.

Optical imaging assemblies 130 and 132 include at least one image sensor and are communicatively coupled to a processor 116. The image sensors may include one or more color cameras, one or more monochrome imagers, and/or one or more optical character readers. The processor 116 may be disposed within the barcode reader 106 or may be in another location. The optical imaging assemblies 130 and 132 are operable to capture one or more images of targets (e.g. target 118) within their respective fields of view (FsOV). As shown in FIG. 1, optical imaging assemblies 130 and 132 may be included in the same barcode reader 106. Alternatively, the optical imaging assemblies 130 and 132 may be included in different barcode readers.

The target 118 may be swiped past the barcode reader 106. In doing so, a product code 120 associated with the target 118 is positioned within the fields of view (FsOV) of the optical imaging assemblies 130 and 132. The product code 120 may be a bar code, a radio-frequency identification (RFID) tag, and/or any other product identifying code.

Figure 2:
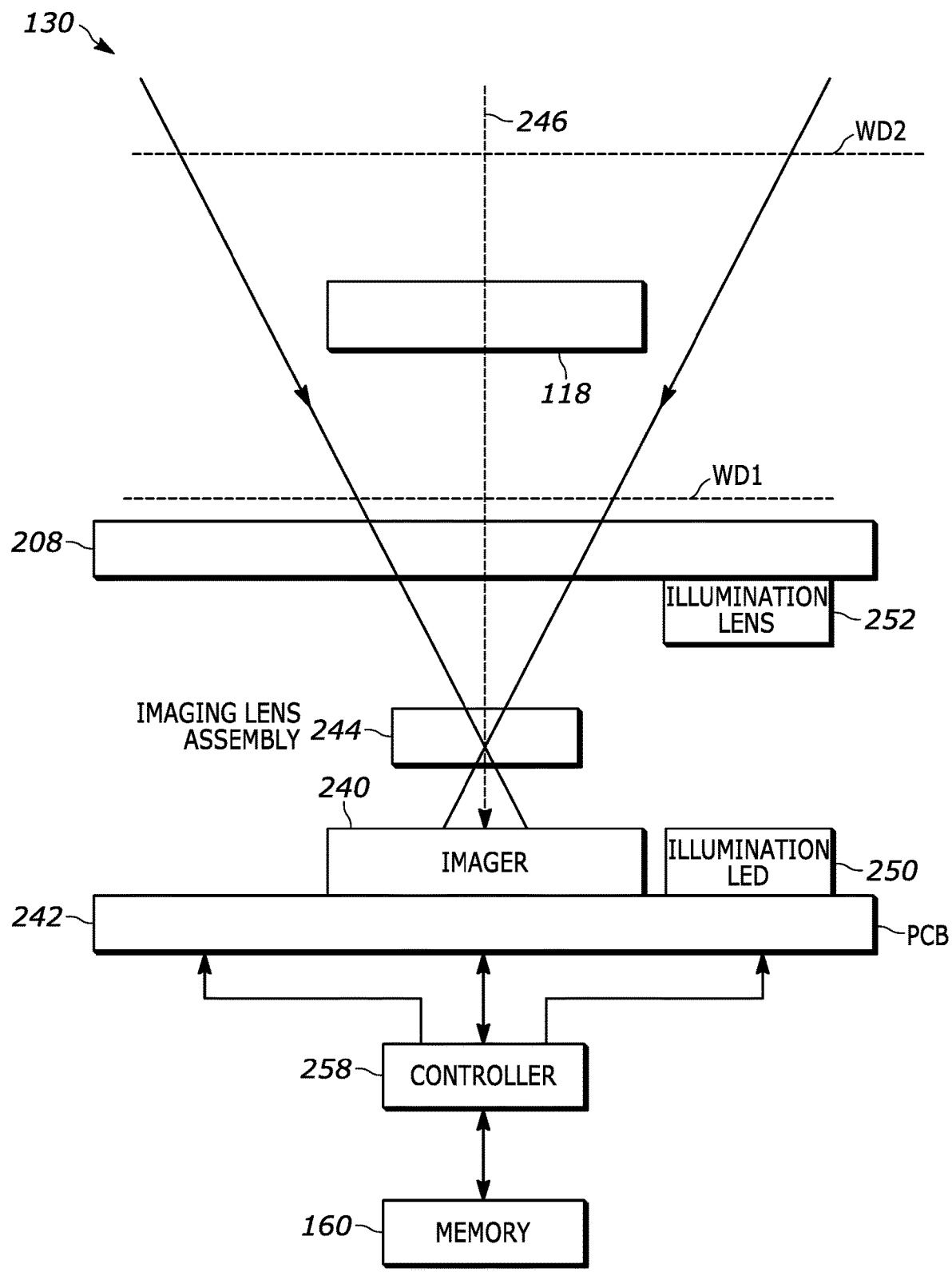
FIG. 2 illustrates a block schematic diagram of some of the components of a barcode reader of FIG. 1 according to an embodiment of the present invention.

Referring to FIG. 2, the optical imaging assembly 130 includes a light-detecting sensor or imager 240 operatively coupled to, or mounted on, a printed circuit board (PCB) 242 in the lower portion 124. Top portion 128 including optical imaging assembly 132 may have a substantially similar configuration. In an embodiment, the imager 240 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 244 over a field of view along an imaging axis 246 through the window 208. The return light is scattered and/or reflected from a target (e.g. target 118) over the field of view. The imaging lens assembly 244 is operative for focusing the return light onto the array of image sensors to enable the target 118, and more particularly product code 120, to be read. The target 118 may be located anywhere in a working range of distances between a close-in working distance (WD1) and a far-out working distance (WD2). In an embodiment, WD1 is about one-half inch from the window 208, and WD2 is about thirty inches from the window 208.

An illuminating light assembly is also mounted in the imaging reader 106 in connection with optical imaging assembly 130 and within lower portion 124. The illuminating light assembly includes an illumination light source, such as at least one light emitting diode (LED) 250 and at least one illumination lens 252, and preferably a plurality of illumination LEDs and illumination lenses, configured to generate a substantially uniform distributed illumination pattern of illumination light on and along the target 118 to be read by image capture. At least part of the scattered and/or reflected return light is derived from the illumination pattern of light on and along the target 118.

As also shown in FIG. 2, the imager 240 and the illumination LED 250 are operatively connected to a controller or programmed microprocessor, for example controller 258, operative for controlling the operation of these components. A memory 160 is connected and accessible to the controller 258. Controller 258 may additionally be configured to control optical imaging assembly 132 and associated illumination LED. Alternatively, optical imaging assembly 130 and optical imaging assembly 132 may be controlled by different controllers. Controller 258 may send information (i.e. one or more images and/or image data) to another controller (e.g. controller 116) for further processing. Alternatively, controller 158 may be controller 116. Further while the optical imaging assemblies 130 and 132 are shown in FIG. 1 as perpendicular, the optical imaging assemblies may be coplanar or in any other arrangement with overlapping FsOV.

Figure 3B:
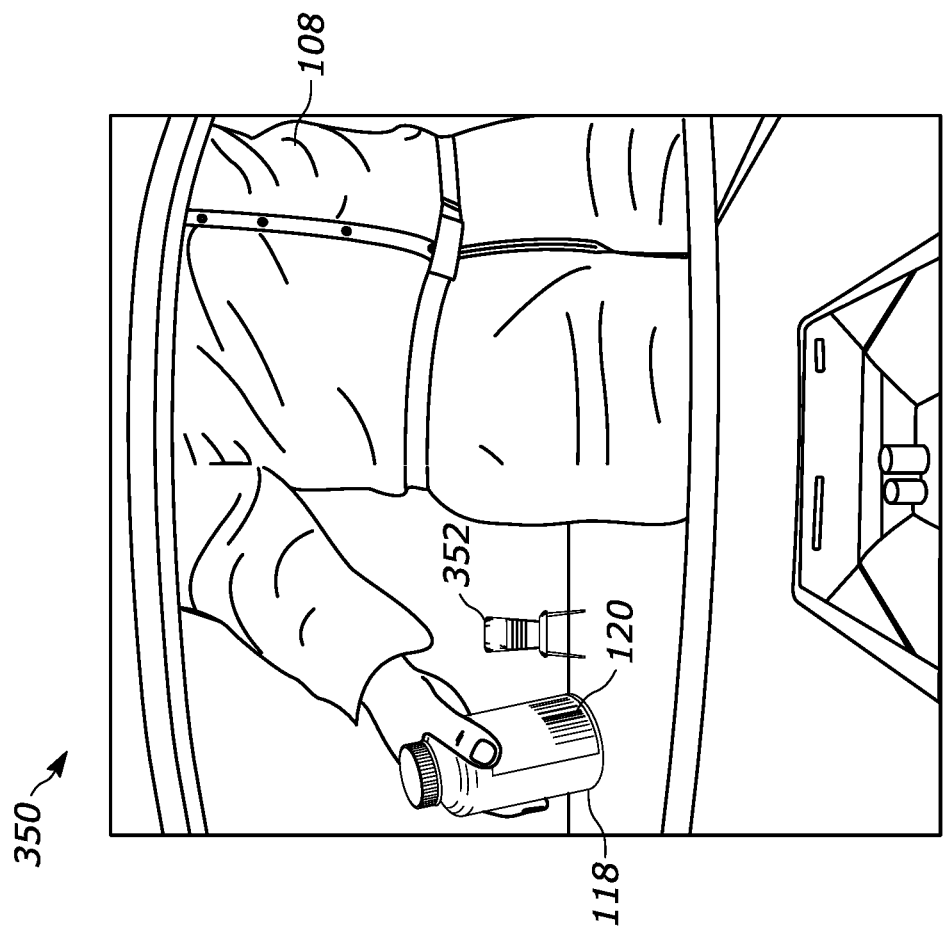
FIG. 3B illustrates an image captured over the field of view (FOV) of optical imaging assembly 132 of FIG. 1.
Figure 3A:
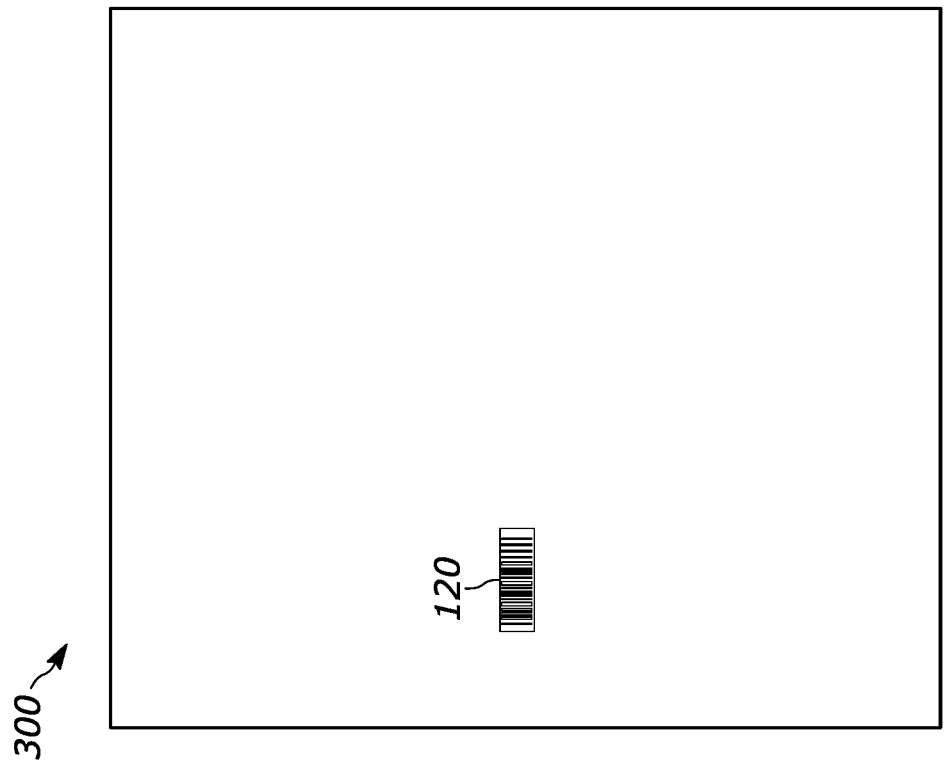
FIG. 3A illustrates an image captured over the field of view (FOV) of optical imaging assembly 130 of FIG. 1.

FIG. 3A illustrates an image captured by the optical imaging assembly 130 over a field of view 300. The image includes, for example, a product code 120 which is associated with a target 118. The controller, (e.g. controller 116) of optical imaging assembly 130 is configured to decode product code 120. Based on successfully decoding product code 120 the controller 158 identifies target 118 within the image 300. Controller 158 may then determine a location of the target 118 within the image.

FIG. 3B illustrates an image captured by the optical imaging assembly 132 over a field of view 350. The image includes, for example, a target 118, a product code 120 associated with the target 118, a clerk 108, and a background object (e.g. chair 352). Controller 116 of the optical imaging assembly 132 is configured to map the location of the target 118 within the image taken by optical imaging assembly 130 over field of view 300 to a predicted location of target 118 within the image taken by optical imaging assembly 132 over field of view 350. In other words, upon detecting a successful decode of a product code 120 associated with the target 118 within a first image, the controller 120 maps the location of the target onto a second image.

The controller 116 may identify a timestamp of the first image and a timestamp of the second image. The controller 116 may map the location based on a timestamp of the first image and the second image. For example, the controller may first verify that the image taken by optical imaging assembly 130 and the image taken by optical imaging assembly 132 were captured at the same or substantially the same time. The timestamp may indicate a time of capture of the image (e.g. Jan. 1, 2020 and 1:11 AM) or, alternatively, the timestamp may indicate a relative time of capture. This may be especially important because optical imaging assemblies 130 and 132 may be configured to capture a plurality of successive images.

Further the controller 116 may map the location of the target 118 within the first image taken by optical imaging assembly 130 over field of view 300 to a predicted location of target 118 within the second image taken by optical imaging assembly 132 over field of view 350 by identifying a first coordinate value along a first axis of the first image corresponding to the target 118 and/or identifying a second coordinate value along a second axis of the first image corresponding to the target 118. The controller may then map the first coordinate value to an equal first coordinate value along a first axis of the second image and/or map the second coordinate value to an offset second coordinate value along a second axis of the second image. For example, the x-coordinates of the field of view 300 may be the same as the x-coordinates of the field of view 350 and therefore, mapping the target 118 from an image taken over the field of view 300 to an image taken over the field of view 350 comprises mapping the x-coordinate of target 118 in the first image to the same x-coordinate in the second image. Additionally, the y-coordinate of the field of view 300 may be slightly offset from the y-coordinates of the field of view 350 and therefore, mapping the target 118 from an image taken over the field of view 300 to an image taken over the field of view 350 comprises mapping the y-coordinate of target 118 in the first image to an offset y-coordinate in the second image.

Figure 4B:
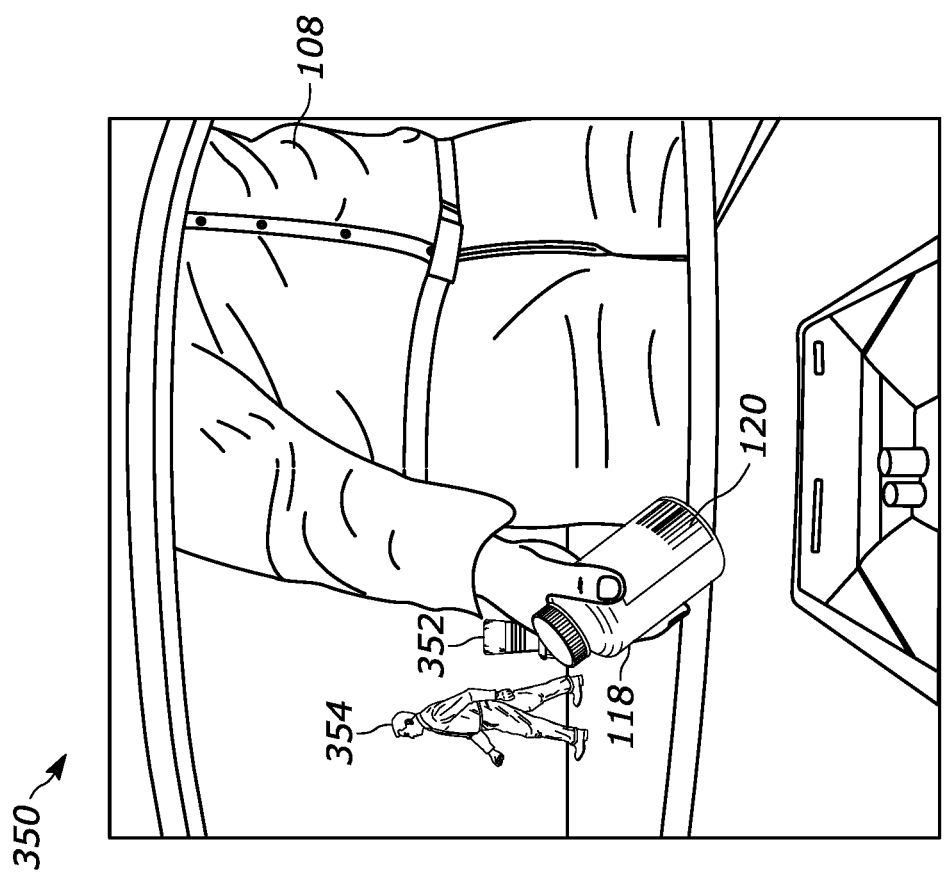
FIG. 4B illustrates another image captured over the field of view (FOV) of optical imaging assembly 132 of FIG. 1.
Figure 4A:
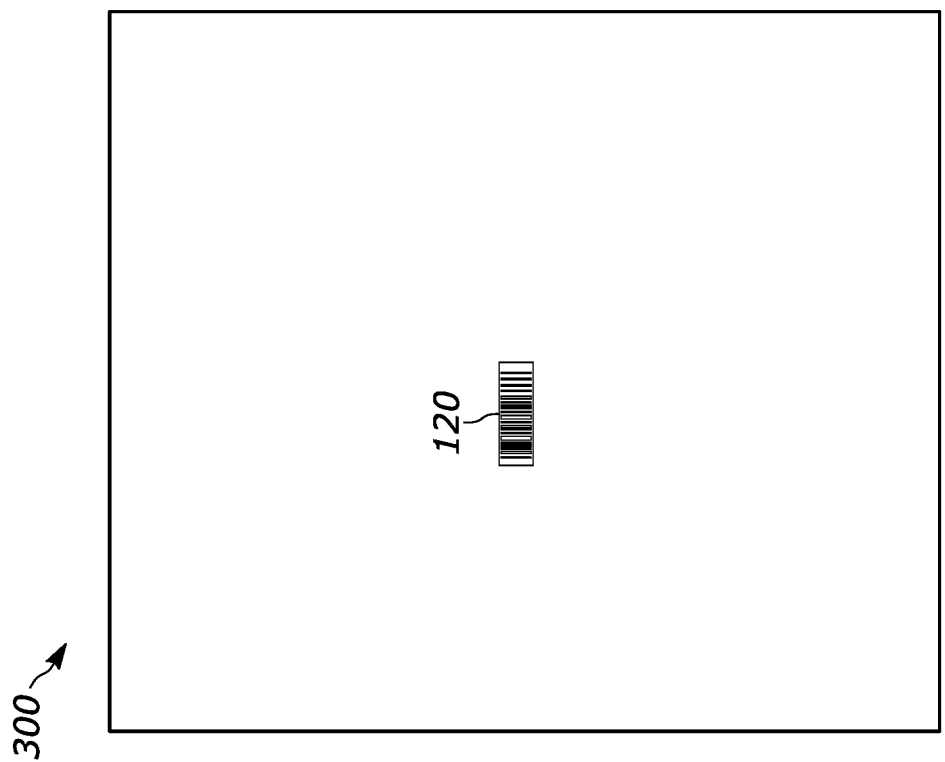
FIG. 4A illustrates another image captured over the field of view (FOV) of optical imaging assembly 130 of FIG. 1.

FIG. 4A illustrates another image captured by the optical imaging assembly 130 over a field of view 300. The image again includes a product code 120 which is associated with a target 118. FIG. 4B illustrates another image captured by the optical imaging assembly 132 over a field of view 350. The image includes, for example, a target 118, a product code 120 associated with the target 118, a clerk 108, and background objects (e.g. chair 352, and person 354). FIGS. 4A and 4B represent images captured subsequent to the images illustrated in FIGS. 3A and 3B.

Figure 5B:
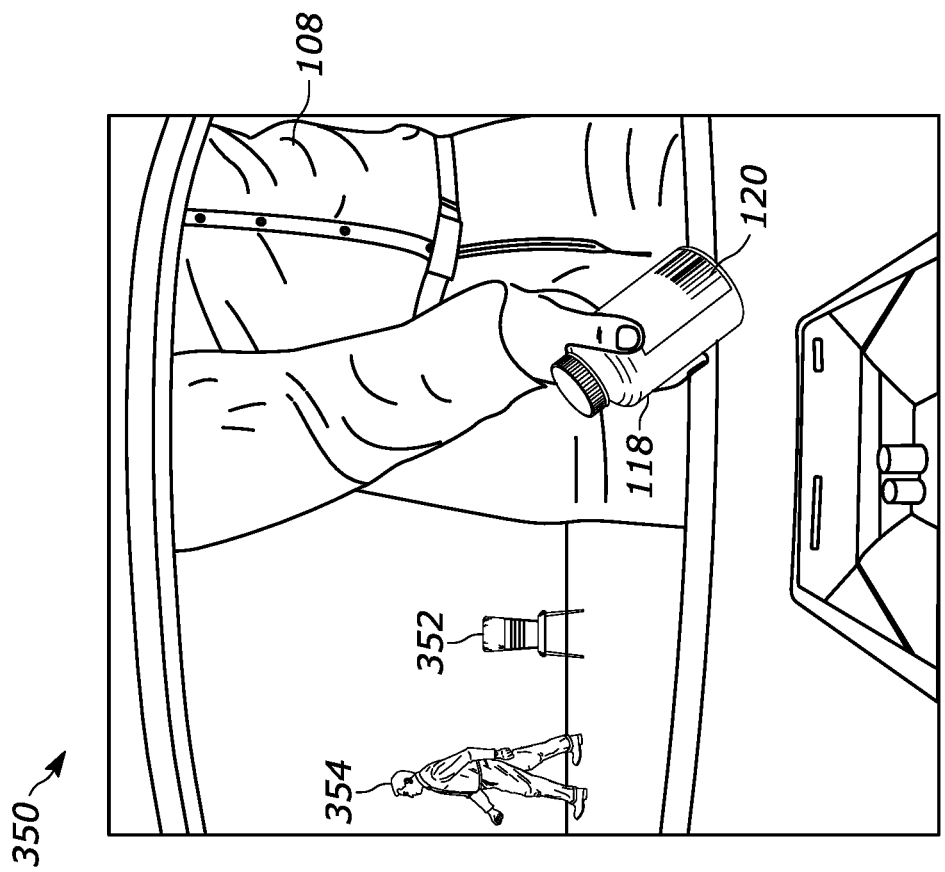
FIG. 5B illustrates yet another image captured over the field of view (FOV) of optical imaging assembly 132 of FIG. 1.
Figure 5A:
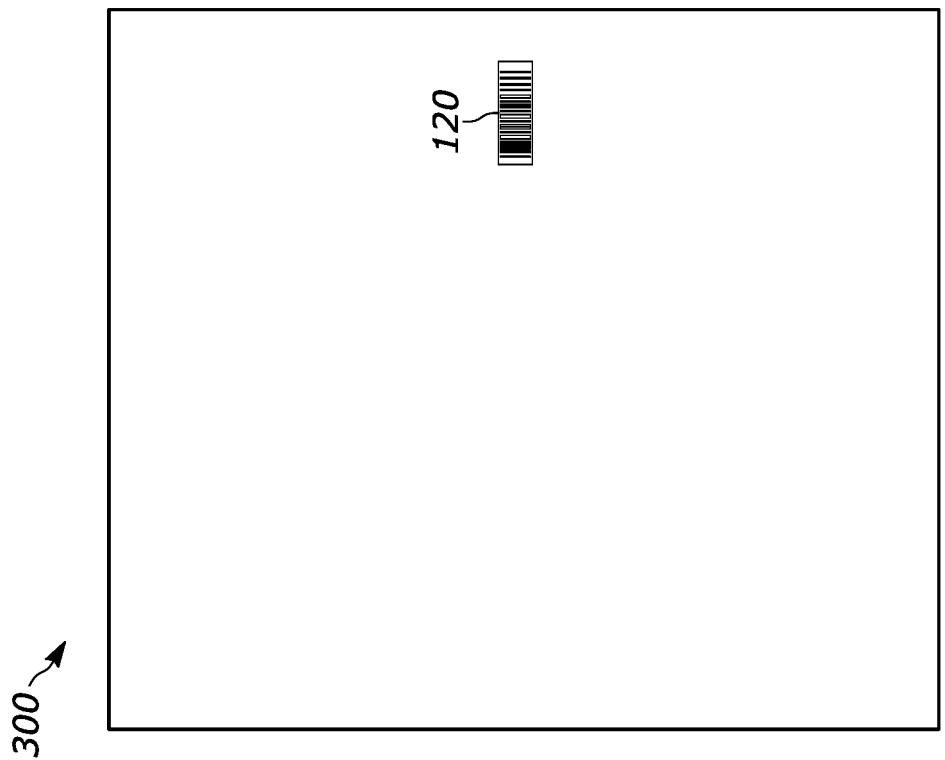
FIG. 5A illustrates yet another image captured over the field of view (FOV) of optical imaging assembly 130 of FIG. 1.

FIG. 5A illustrates yet another image captured by the optical imaging assembly 130 over a field of view 300. The image again includes a product code 120 which is associated with a target 118. FIG. 58 illustrates yet another image captured by the optical imaging assembly 132 over a field of view 350. The image includes, for example, a target 118, a product code 120 associated with the target 118, a clerk 108, and background objects (e.g. chair 352, and person 354). FIGS. 5A and 5B represent images captured subsequent to the images illustrated in FIGS. 4A and 4B.

The controller 116 may be configured to identify within an image one or more moving objects (e.g. target 118 and person 354) and one or more stationary areas (e.g. the area surrounding chair 352). Further, the controller 116 may be configured image data of one or more images based on the stationary areas (e.g. the area surrounding chair 352). Controller 116 may discard the image data associated with stationary areas (e.g. the area surrounding chair 352) and keep only image data associated with moving objects (e.g. target 118 and person 354).

The controller 116 may additionally be configured to identify one or more moving objects of interest (e.g. target 118) and one or more foreign moving objects (e.g. person 354) within an image. Controller 116 may also be configured to filter image data based on one or more moving objects of interest (e.g. target 118) and one or more foreign moving objects (e.g. person 354). The controller 116 may identify the one or more moving objects of interest based on the location or the predicted location of the target 118. For example, if the controller detects a moving object at the location or the predicted location of the target 118, the object is likely to be an object of interest (e.g. target 118). However, if the controller detects a moving object at a different location than the location or the predicted location of the target 118, the object is likely to be a foreign moving object (e.g. person 354).

The controller 116 may further filter an image by placing a bounding box around an object of interest (e.g. target 118) and filtering image data that is not within the bounding box. The controller may do this by placing a bounding box around the location or predicted location of the target 118.

Figure 6:
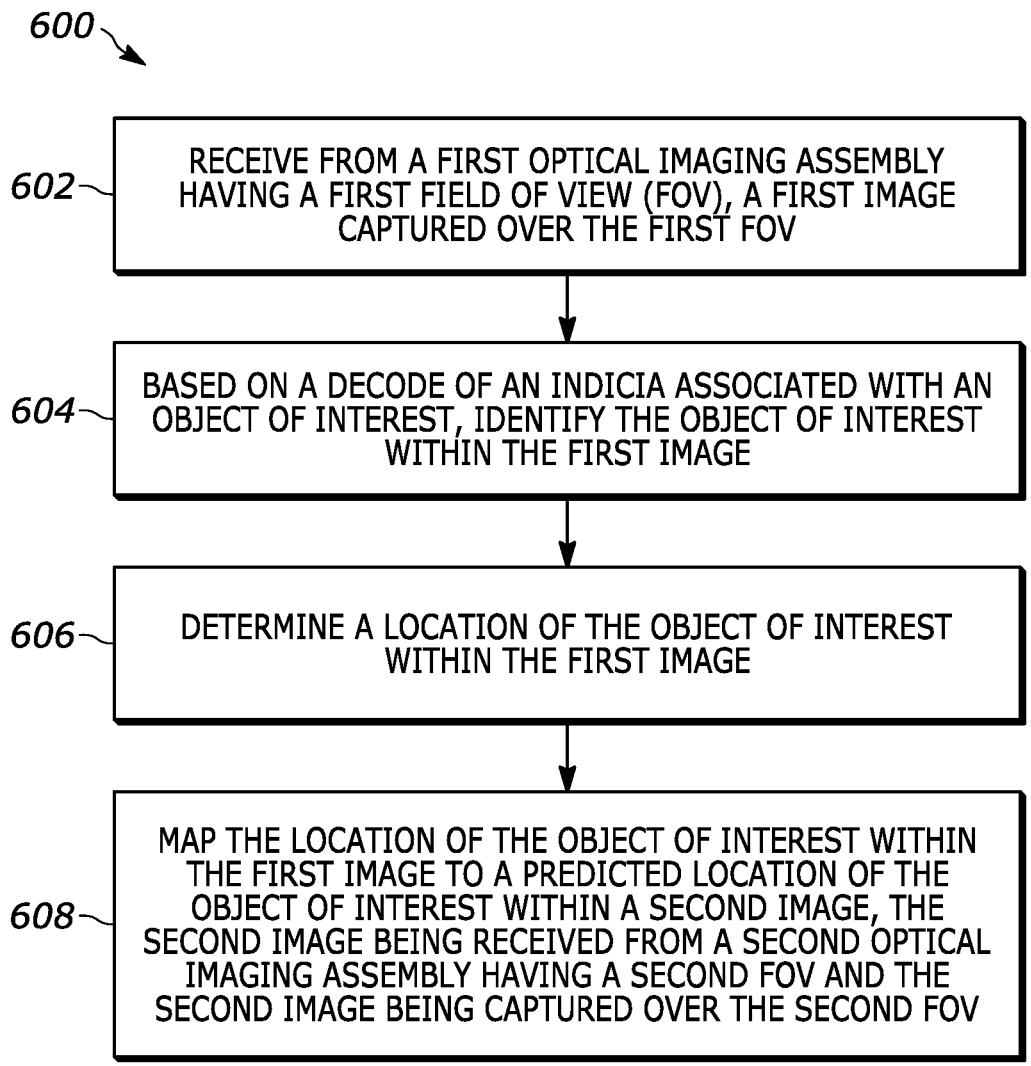
FIG. 6 is a flowchart of a method for accurate object tracking according to an embodiment of the present invention.

Referring to FIG. 6, a flowchart 600 for accurate object tracking by a controller 116, which is in communication with a first optical imaging assembly 130 and a second optical imaging assembly 132, is shown. Beginning at block 602, the controller 116 receives, from first optical imaging assembly optical imaging assembly 130 having a first field of view (FOV) 300, a first image captured over the first FOV 300. The controller 116 may also identify a timestamp of the first image and the first image may be one of a plurality of images captured by the first optical imaging assembly 130.

At block 604, the controller 116 based a decode of an indicia (e.g. product code 120) associated with an object of interest (e.g. target 118), identifies the object of interest (e.g. target 118) within the first image and, at block 606, the controller 116 determines a location of the object of interest (e.g. target 118) within the first image. Next, at block 608, the controller 116 maps the location of the object of interest (e.g. target 118) within the first image to a predicted location of the object of interest (e.g. target 118) within a second image. The second image is received from a second optical imaging assembly 132 having a second FOV 350 and the second image is captured over the second FOV 350. The controller may also identify a timestamp of the second image and the second image may be one of a plurality of images captured by the second optical imaging assembly 132.

Figure 7:
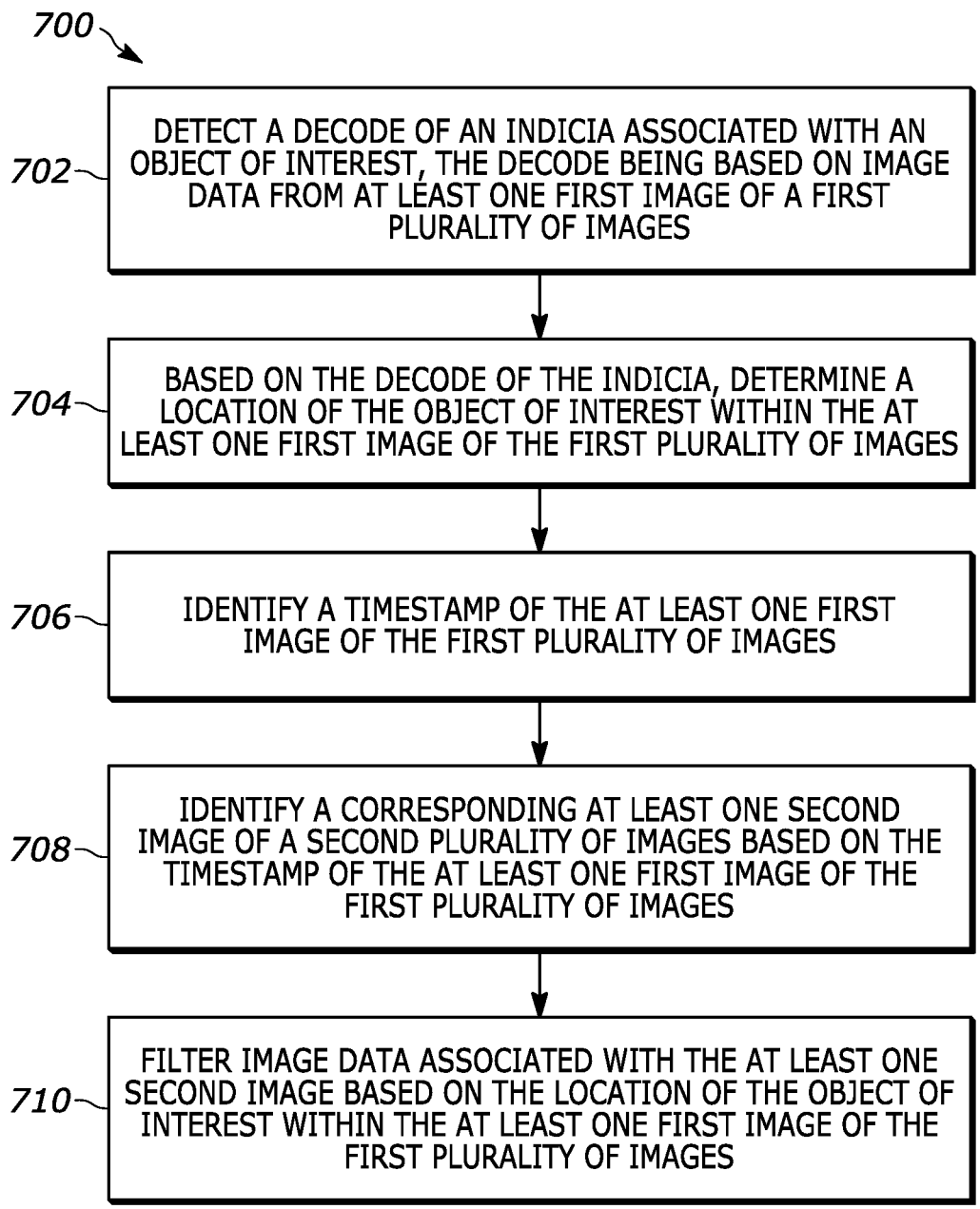
FIG. 7 is a flowchart of another method for accurate object tracking according to another embodiment of the present invention.

Referring now to FIG. 7, a flowchart 700 for accurate object tracking by a controller 116, which is in communication with a first optical imaging assembly 130 and a second optical imaging assembly 132, is shown. Beginning at block 702, the controller 116 detects a decode of an indicia (e.g. product code 120) associated with an object of interest (e.g. target 118), the decode being based on image data from at least one first image of a first plurality of images, wherein the first plurality of images is captured by the first optical imaging assembly 130. At block 704, based on the decode of the indicia (e.g. product code 120), the controller 116 determines a location of the object of interest (e.g. target 118) within the at least one first image of the first plurality of images.

Next, at block 706, the controller identifies a timestamp of the at least one first image of the first plurality of images and at block 708, the controller 116 identifies a corresponding at least one second image of the second plurality of images based on the timestamp of the at least one first image of the first plurality of images. For example, the first image and the second image may have the same or a substantially similar timestamp. The controller 116 receives the second plurality of images from the second optical imaging assembly 132. At block 710, the controller 116 filters image data associated with the at least one second image based on the location of the object of interest (e.g. target 118) within the at least one first image of the first plurality of images.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for accurate object tracking, the method comprising:
   receiving, from a first optical imaging assembly having a first field of view (FOV), a first image captured over the first FOV;
   based on a decode of an indicia associated with an object of interest, identifying the object of interest within the first image;

determining a location of the object of interest within the first image; and mapping the location of the object of interest within the first image to a predicted location of the object of interest within a second image, the second image being received from a second optical imaging assembly having a second FOV and the second image being captured over the second FOV.

2. The method of claim 1, wherein the mapping the location of the object of interest within the first image to the predicted location of the object of interest within the second image is based on a timestamp of the first image and a timestamp of the second image.

3. The method of claim 1, wherein the first image is one of a plurality of images captured by the first optical imaging assembly and the second image is one of a plurality of images captured by the second optical imaging assembly.

4. The method of claim 1, further comprising:
identifying a first coordinate value along a first axis of the first image corresponding to the object of interest and identifying a second coordinate value along a second axis of the first image corresponding to the object of interest;
mapping the first coordinate value to a first offset coordinate value along a first axis of the second image, wherein the first offset coordinate value is based on a relative positional relationship between the first optical imaging assembly and the second optical imaging assembly; and
mapping the second coordinate value to a second offset coordinate value along a second axis of the second image, wherein the second offset coordinate value is based on the relative positional relationship between the first optical imaging assembly and the second optical imaging assembly.

5. The method of claim 1, further comprising:
identifying one or more moving objects and one or more stationary areas within the second image; and
filtering image data associated with the second image based on at least the one or more stationary areas.

6. The method of claim 1, further comprising:
identifying one or more moving objects of interest within the second image based on the predicted location of the object of interest within the second image;
identifying one or more foreign moving objects within the second image, the one or more foreign moving objects being separate from the one or more moving objects of interest; and
filtering image data associated with the second image based on the one or more foreign moving objects.

7. The method of claim 1, further comprising:
identifying a bounding box around the object of interest within the second image; and
filtering image data in the second image based on at least one of internal contents of the bounding box and external contents of the bounding box.

8. A barcode reader assembly for accurate object tracking, the barcode reader assembly comprising:
a housing;
a first optical imaging assembly positioned at least partially within the housing, the first optical imaging assembly having a first field of view (FOV) and configured to capture a first plurality of images;
a second optical imaging assembly having a second FOV and configured to capture a second plurality of images; and a controller communicatively coupled to the first optical imaging assembly and the second optical imaging assembly, the controller being configured to:
detect a decode of an indicia associated with an object of interest, the decode being based on image data from at least one first image of the first plurality of images;
based on the decode of the indicia, determine a location of the object of interest within the at least one first image of the first plurality of images,
identify a timestamp of the at least one first image of the first plurality of images;
identify a corresponding at least one second image of the second plurality of images based on the timestamp of the at least one first image of the first plurality of images; and
filter image data associated with the at least one second image based on the location of the object of interest within the at least one first image of the first plurality of images.

9. The barcode reader assembly of claim 8, wherein the controller is mounted within the housing.

10. The barcode reader assembly of claim 8, wherein the second optical imaging assembly is positioned at least partially within the housing.

11. The barcode reader assembly of claim 8, wherein the barcode reader assembly is a bioptic barcode reader assembly.

12. The barcode reader assembly of claim 8, wherein the controller is further configured to:
identify a first coordinate value along a first axis of the at least one first image of the first plurality of images corresponding to the object of interest and identify a second coordinate value along a second axis of the at least first image of the first plurality of images corresponding to the object of interest;
map the first coordinate value to a first offset coordinate value along a first axis of the at least one second image of the second plurality of images, wherein the first offset coordinate value is based on a relative positional relationship between the first optical imaging assembly and the second optical imaging assembly; and
map the second coordinate value to a second offset coordinate value along a second axis of the at least one second image of the second plurality of images, wherein the second offset coordinate value is based on the relative positional relationship between the first optical imaging assembly and the second optical imaging assembly.

13. The barcode reader assembly of claim 8, wherein the controller is further configured to:
identify one or more moving objects of interest within the at least one second image of the second plurality of images based on the location of the object of interest within the at least one first image of the first plurality of images;
identify one or more foreign moving objects within the at least one second image of the second plurality of images, the one or more foreign moving objects being separate from the one or more moving objects of interest; and
filter image data associated with the at least one second image of the second plurality of images based on the one or more foreign moving objects.

14. A system for accurate object tracking, the system comprising:

a first optical imaging assembly having a first field of view (FOV) and configured to capture a first image over the first FOV;

a second optical imaging assembly having a second FOV and configured to capture a second image over the second FOV; and a controller configured to:
receive the first image and the second image,
based on a decode of an indicia associated with an object of interest, identify the object of interest within the first image,
determine a location of the object of interest within the first image, and
map the location of the object of interest within the first image to a predicted location of the object of interest within a second image.

15. The system of claim 14, wherein the controller is further configured to map the location of the object of interest within the first image to the predicted location of the object of interest within the second image based on a timestamp of the first image and a timestamp of the second image.

16. The system of claim 14, wherein the controller is further configured to:
identify a first coordinate value along a first axis of the first image corresponding to the object of interest and identify a second coordinate value along a second axis of the first image corresponding to the object of interest;
map the first coordinate value to a first offset coordinate value along a first axis of the second image, wherein the first offset coordinate value is based on a relative positional relationship between the first optical imaging assembly and the second optical imaging assembly; and
map the second coordinate value to a second offset coordinate value along a second axis of the second image, wherein the second offset coordinate value is based on the relative positional relationship between the first optical imaging assembly and the second optical imaging assembly.

17. The system of claim 14, wherein the controller is further configured to:
identify one or more moving objects and one or more stationary areas within the second image; and
filter image data associated with the second image based on at least the one or more stationary areas.

18. The system of claim 14, wherein the controller is further configured to:
identify one or more moving objects of interest within the second image based on the predicted location of the object of interest within the second image;
identify one or more foreign moving objects within the second image, the one or more foreign moving objects being separate from the one or more moving objects of interest; and
filter image data associated with the second image based on the one or more foreign moving objects.

19. The system of claim 14, wherein the controller is further configured to:
identify a bounding box around the object of interest within the second image; and
filter image data in the second image based on at least one of internal contents of the bounding box and external contents of the bounding box.

20. The system of claim 14, wherein the first optical imaging assembly is further configured to capture monochrome images and the second optical imaging assembly is further configured to capture color images.

* * * * *